(12) United States Patent
Agostini et al.

(10) Patent No.: US 9,423,305 B2
(45) Date of Patent: Aug. 23, 2016

(54) DEVICE FOR TESTING A SENSOR OF TRAIN UNDERCARRIAGE TEMPERATURES

(71) Applicant: Progress Rail Services Corporation, Albertville, AL (US)

(72) Inventors: Alessandro Agostini, Florence (IT); Andrea Ricci, Florence (IT)

(73) Assignee: Progress Rail Services Corporation, Albertville, AL (US)

( * ) Notice: Subject to any disclaimer, the term of this patent is extended or adjusted under 35 U.S.C. 154(b) by 0 days.

(21) Appl. No.: 14/577,799

(22) Filed: Dec. 19, 2014

(65) Prior Publication Data

US 2015/0131696 A1 May 14, 2015

Related U.S. Application Data

(62) Division of application No. 13/605,764, filed on Sep. 6, 2012, now Pat. No. 8,944,677.

(30) Foreign Application Priority Data

Oct. 17, 2011 (EP) .................................. 11185451

(51) Int. Cl.
| | |
|---|---|
| *G01K 13/00* | (2006.01) |
| *G01K 1/00* | (2006.01) |
| *G01K 7/00* | (2006.01) |
| *G01J 5/00* | (2006.01) |
| *G01J 5/52* | (2006.01) |
| *B61K 9/06* | (2006.01) |
| *G01J 5/02* | (2006.01) |

(52) U.S. Cl.
CPC .................. *G01J 5/522* (2013.01); *B61K 9/06* (2013.01); *G01J 5/02* (2013.01); *G01J 5/524* (2013.01)

(58) Field of Classification Search
USPC .............. 374/2, 141, 121, 166, 208, 112, 57
See application file for complete search history.

(56) References Cited

U.S. PATENT DOCUMENTS

| | | | |
|---|---|---|---|
| 3,086,108 A * | 4/1963 | Kaehms .................... | 246/169 D |
| 4,878,437 A | 11/1989 | Myers et al. | |
| 4,974,797 A | 12/1990 | Myers et al. | |
| 5,060,890 A | 10/1991 | Utterback et al. | |
| 5,149,025 A | 9/1992 | Utterback et al. | |
| 6,828,170 B2 | 12/2004 | Roberts et al. | |
| 7,022,993 B1 | 4/2006 | Williams et al. | |
| 8,944,677 B2 | 2/2015 | Agostini et al. | |
| 2008/0073594 A1 | 3/2008 | Lee et al. | |
| 2014/0321501 A1* | 10/2014 | Bartonek et al. ............. | 374/121 |

* cited by examiner

*Primary Examiner* — Mirellys Jagan
(74) *Attorney, Agent, or Firm* — Miller, Matthias & Hull LLP

(57) ABSTRACT

A test apparatus for testing an IR sensor of train undercarriage temperatures is disclosed. The IR sensor may be used to obtain infrared IR emission data by sensing a wheel or a wheel bearing of a rail vehicle. The test apparatus may comprise a heat emitter for supplying IR emissions at a reference temperature to the IR sensor. A support may support the heat emitter at a position spaced from the passage of the rail vehicle and in an orientation for directing the IR emissions at the IR sensor.

7 Claims, 3 Drawing Sheets

DEVICE FOR TESTING A SENSOR OF TRAIN UNDERCARRIAGE TEMPERATURES

CROSS-REFERENCE TO RELATED APPLICATIONS

This is a divisional application under 35 USC §121 claiming priority to U.S. patent application Ser. No. 13/605,764 filed on Sep. 6, 2012, which is based upon and claims the benefit of priority from European Patent Application No. EP11185451.9 by Alessandro Agostini et al., filed Oct. 17, 2011.

TECHNICAL FIELD

This disclosure generally relates to the field of rail transportation, and to the field of infrared sensors for undercarriage components of trains. This disclosure relates, more particularly, to the testing of infrared sensors for undercarriage components of trains.

BACKGROUND

Safe and reliable operation of a railroad system may be dependent upon the integrity of the undercarriage components of the vehicles travelling over the rails. Worn or damaged train wheel bearings may increase the rolling friction of an axle requiring an increase of power to move the train. In addition, worn or damaged bearings may cause excessive wear to the train axle and, in the case of failure of the bearing, may even cause the axle to lock up, preventing rotation of the wheel and thus resulting in a potential fire hazard due to the heat build up and potential sparking caused by friction of the locked wheel scraping along the rail.

Bearing temperatures may be scanned by sensing a temperature of the wheel bearing indirectly through a bearing box surrounding the wheel bearing on a rail car of a train. For example, infrared radiation (IR) sensors may be mounted along a rail to detect IR energy emitted by an outer wheel bearing of passing rail cars. The emissions of IR energy may be indicative of a temperature of the wheel bearing.

The bearing temperatures may be scanned by sensors that may comprise sensing elements which may be aimed at different parts of a target scanning area of a rail vehicle undercarriage component. The IR data obtained may be used to generate respective scanning signature waveform data corresponding to each different region. The sensor may be oriented such that at least one of the elements receives unobstructed infrared emissions from the undercarriage component of a rail vehicle passing the sensor. A control circuit for the sensors may cause an alarm to be raised if the IR data is indicative of temperature that is higher than a pre-set temperature threshold.

However, the sensors may have failures in performance which may not be detectable by the sensors or by the control circuit connected to the sensors. A failure may be the misalignment in a sensing element such that the element is no longer aimed at a target area of a rail vehicle undercarriage component. Another failure may be an incorrect data being generated based on the IR emissions.

The present disclosure is directed, at least in part, to improving or overcoming one or more aspects of the prior art system.

BRIEF SUMMARY OF THE INVENTION

In a first aspect, the present disclosure describes a test apparatus for a IR sensor of a rail vehicle undercarriage component, the test apparatus comprising a heat emitter for producing IR emissions at a reference temperature; a support for supporting the heat emitter at a position spaced from the passage of the rail vehicle and in an orientation for directing the IR emissions at the IR sensor.

In a second aspect, the present disclosure describes a method of testing an IR sensor of a rail vehicle undercarriage component, the method comprising the steps of providing a heat emitter for producing IR emissions at a reference temperature; supporting the heat emitter on a support at a position spaced from the passage of the rail vehicle and in an orientation for directing the IR emissions at the IR sensor; activating the heat emitter to produce IR emissions at the reference temperature; and comparing the reference temperature and the temperature detected by the IR sensor.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a test apparatus 10 for an infrared (IR) sensor which is provided to detect the temperatures of rail vehicle undercarriage components.

Figure 1:
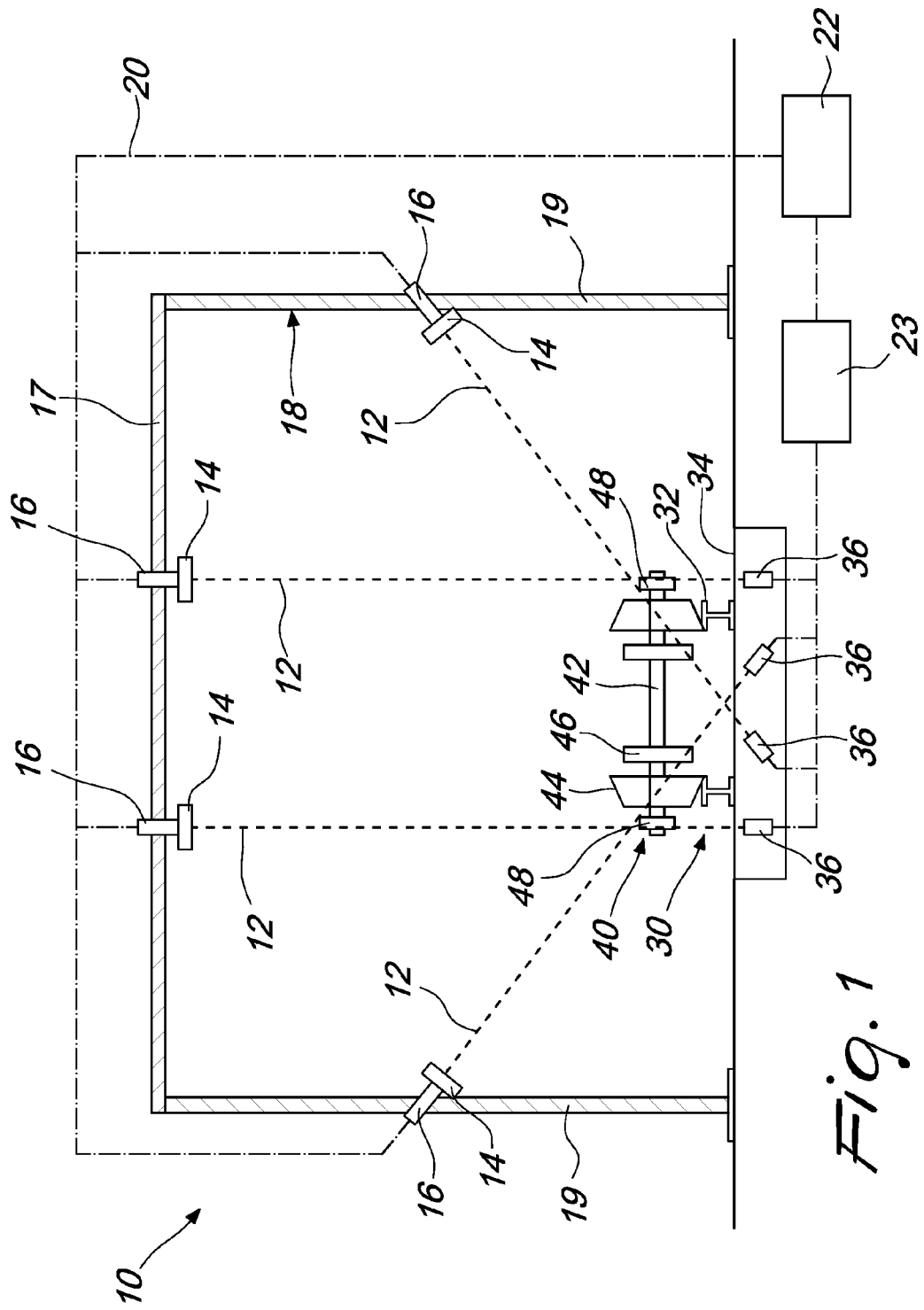
FIG. 1 is a representation of a test apparatus positioned over a rail vehicle undercarriage and IR sensors embedded in a metal railroad tie, or sleeper according to the present disclosure.

With reference to FIG. 1, the test apparatus 10 may test the accuracy and reliability of an IR sensor 36. The test apparatus 10 may be located at a rail track 30 for testing the IR sensor 36 that may be positioned in a rail bed of the track 30, such as within a cross tie or a sleeper 34.

The IR sensor 36 may obtain IR data from a rail vehicle undercarriage 40. The rail undercarriage 40 may comprise components such as wheels 44, wheel bearings 46, 48 and an axle 42. The IR sensor 36 may be orientated so as to obtain IR data from the one of the rail vehicle undercarriage components. The IR data may be obtained as the axle 42 passes over IR sensor 36.

In an embodiment, a plurality of IR sensors 36 may be disposed in the rail bed of the track 30. The IR sensors 36 may each be orientated to scan the various rail undercarriage components.

The test apparatus 10 may be positioned away from the passage of the rail vehicle. The passage of the rail vehicle may be defined as the spatial course of the rail vehicle travelling on the track 30. The passage of the rail vehicle may also be defined as the movement of the rail vehicle travelling on the track 30.

The test apparatus 10 may be positioned over the track 30. In an embodiment, the test apparatus 10 may be positioned to the side of the track 30.

The test apparatus 10 may comprise a heat emitter 14 and a support 18. The heat emitter 14 may be connected to the support 18. In an embodiment, the heat emitter may be coupled to a connecting member 16 for connection to the support 18.

The heat emitter 14 may produce IR emissions. IR emissions may include both high speed thermal flashes and thermal radiation from a heated surface. The IR emissions may be at a reference temperature. The IR emissions may be controllably varied to be produced at different reference temperatures. The IR emissions may be detected by the IR sensor 36.

Figure 2:
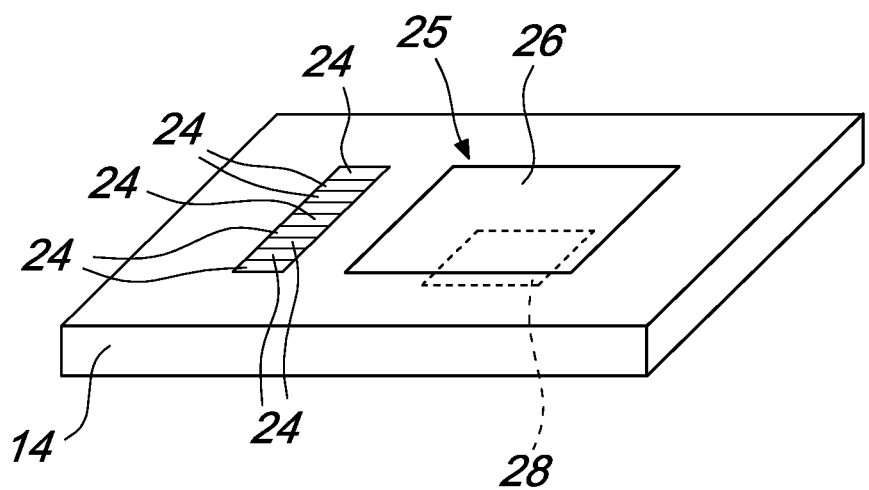
FIG. 2 is a representation of a heat emitter according to the present disclosure.

With reference to FIG. 2, the heat emitter 14 may comprise at least one high speed infrared LED (IR LED) 24. The IR LED 24 may generate high speed thermal flashes. The IR LED 24 may generate high speed thermal flashes. The IR LED 24 may be controlled by an electronic circuit external to the heat emitter 14. In an embodiment, the IR LED 24 may be controlled by an electronic circuit within the heat emitter 14.

In an embodiment, the heat emitter 14 may comprise a plurality of high speed IR LEDs 24. The plurality of IR LEDs 24 may be arranged in an array that corresponds to an array of IR sensor elements in the IR sensor 36. Each IR LED 24 may be controlled to generate high speed thermal flashes one at a time. The plurality of IR LEDs 24 may be controlled to generate high speed thermal flashes randomly. The plurality of IR LEDs 24 may be controlled to generate high speed thermal flashes randomly.

The plurality of IR LEDs 24 may be controlled to mimic a temperature pattern of a rail undercarriage component of a passing rail vehicle. The plurality of IR LEDs 24 may be controlled by an electronic circuit external to the heat emitter 14. In an embodiment, the plurality of IR LEDs 24 may be controlled by an electronic circuit within the heat emitter 14.

The heat emitter 14 may comprise a heat member 25 which is capable of producing thermal radiation. In an embodiment, the heat member 25 may comprise a black surface 26 coupled to a resistor. The resistor may heat the black surface 26. In an embodiment, the black surface 26 may be superposed on the resistor. The resistor may be disposed in the heat emitter 14 so as not to interfere with the thermal radiation from the black surface 26. The temperature of the black surface 24 may be regulated by varying the resistor.

The heat member 25 may be controlled by an electronic circuit external to the heat emitter 14. In an embodiment, the heat member 25 may be controlled by an electronic circuit within the heat emitter 14.

The heat emitter 14 may comprise a temperature sensor 28. The temperature sensor 28 may sense the temperature of the black surface 26. The temperature sensor 28 may allow the temperature of the black surface 26 to be controlled. The temperature sensor 28 may be disposed in the heat emitter 14 so as not to interfere with the thermal radiation from the black surface 26.

The heat emitter 14 may comprise both the heat member 25 and the IR LED 24. The heat member 25 and the IR LED 24 may be provided on the heat emitter 14 such that the IR emissions from either sources are detectable by the IR sensor 36. The heat member 25 and the IR LED 24 may be disposed on a flat surface of the heat emitter 14. The heat member 25 may be positioned adjacent to the IR LED 24.

In an embodiment, the heat emitter 14 may comprise either the heat member 25 or the IR LED 24. The heat member 25 or the IR LED 24 may be disposed on the heat emitter 14 such that the IR emissions may be detectable by the IR sensor 36.

In an embodiment, the support 18 may be positioned to the side of the track 30. The support 18 may comprise of upright beam 19. The beam 19 may extend perpendicularly relative to the track 30. The beam 19 may have a cross beam 17 cantilevered to the beam 19. The cross beam 17 may be positioned at a height that is greater than the highest part of the rail vehicle. The beam 19 may be positioned away from the track 30.

With reference to FIG. 1, in an embodiment, the support 18 may be positioned over the track 30. The support 18 may be an upright frame spanning the track 30. The support 18 may comprise of pair of upright beams 19 disposed on either sides of the track 30. The beams 19 may extend perpendicularly relative to the track 30. The beams 19 may be connected by a cross beam 17. The cross beam 17 may be positioned over the track 30 and orthogonal to the rails 32 of the track 30. The cross beam 17 may be positioned at a height that is greater than the highest part of the rail vehicle. The beams 19 may be positioned away from the track 30. The position of the support 18 may correspond with the rail bed of the track 30 wherein IR sensor 36 or IR sensors 36 are located.

The support 18 may support the heat emitter 14 at a position suitable for testing the IR sensor 36. The support 18 may support the heat emitter 14 at a position that is spaced from the passage of the rail vehicle. The heat emitter 14 may be in a position located away from the passage of the rail vehicle while suitable for testing the IR sensor 36. The heat emitter 14 may be positioned over the track 30. The heat emitter 14 may be positioned to the side of the track 30 and supported above the level of the track 30.

The support 18 may support the heat emitter 14 in an orientation suitable for testing the IR sensor 36. The heat emitter 14 may be installed on the support 18 such that the IR emissions may be detected by the IR sensor 36. The support 18 may support the heat emitter 14 in an orientation for directing the IR emissions at the IR sensor 36. The emission line 12 may indicate the direction of the IR emissions from the heat emitter 14.

The heat emitter 14 may be installed on the support 18 to receive a scanning beam from the IR sensor 36 which is orientated to obtain IR emission data from the one of the rail vehicle undercarriage components.

The direction of IR emissions of the heat member 25 and the IR LED 24 on the heat emitter 14 may be indicated by the line 12. The direction of IR emissions of the heat member 25 and the IR LED 24 may be detected by the IR sensor 36.

In an embodiment, the direction of IR emissions of either the heat member 25 or the IR LED 24 on the heat emitter 14 may be indicated by the line 12. The direction of IR emissions of the heat member 25 or the IR LED 24 may be detected by the IR sensor 36.

In an embodiment, the test apparatus 10 may comprise a plurality of heat emitters 14. The number of heat emitters 14 may correspond to the number of IR sensors 36 that are installed in the rail bed of the track 30.

The support 18 may support the heat emitters 14 at specific positions that are suitable for testing respective IR sensor 36. The support 18 may support the heat emitters 14 at positions that are spaced from the passage of the rail vehicle. The heat emitters 14 may be in positions located away from the passage of the rail vehicle while suitable for testing the respective IR sensors 36. The heat emitters 14 may be positioned over the track 30.

The support 18 may support the heat emitters 14 in specific orientations for directing the IR emissions at the respective IR sensors 36. The emission lines 12 may indicate the directions of the IR emissions from each heat emitter 14 to the respective IR sensor 36.

The plurality of heat emitters 14 may be installed on the support 18 at the respective positions so as to receive scanning beams from the corresponding IR sensors 36 that are orientated to obtain IR emission data from the respective rail vehicle undercarriage components.

The direction of IR emissions of the heat members 25 and the IR LEDs 24 on each heat emitter 14 may be indicated by the lines 12. The direction of IR emissions of the heat members 25 and the IR LEDs 24 on each heat emitter 14 may be detected by the respective IR sensor 36.

In an embodiment, the direction of IR emissions of the either the heat members 25 or the IR LEDs 24 on each heat emitter 14 may be indicated by the lines 12. The direction of IR emissions of the heat members 25 or the IR LEDs 24 on each heat emitter 14 may be detected by the respective IR sensor 36.

The test apparatus 10 may comprise a test circuit 20. The test circuit 20 may connect the heat emitter 14 to a controller 22. In an embodiment, the test circuit 20 may connect the plurality of heat emitters 14 to a controller 22. The external electronic circuit controlling the IR LEDs 24 or the heat members 25 may be the test circuit 20 connected to the controller 22.

Figure 3:
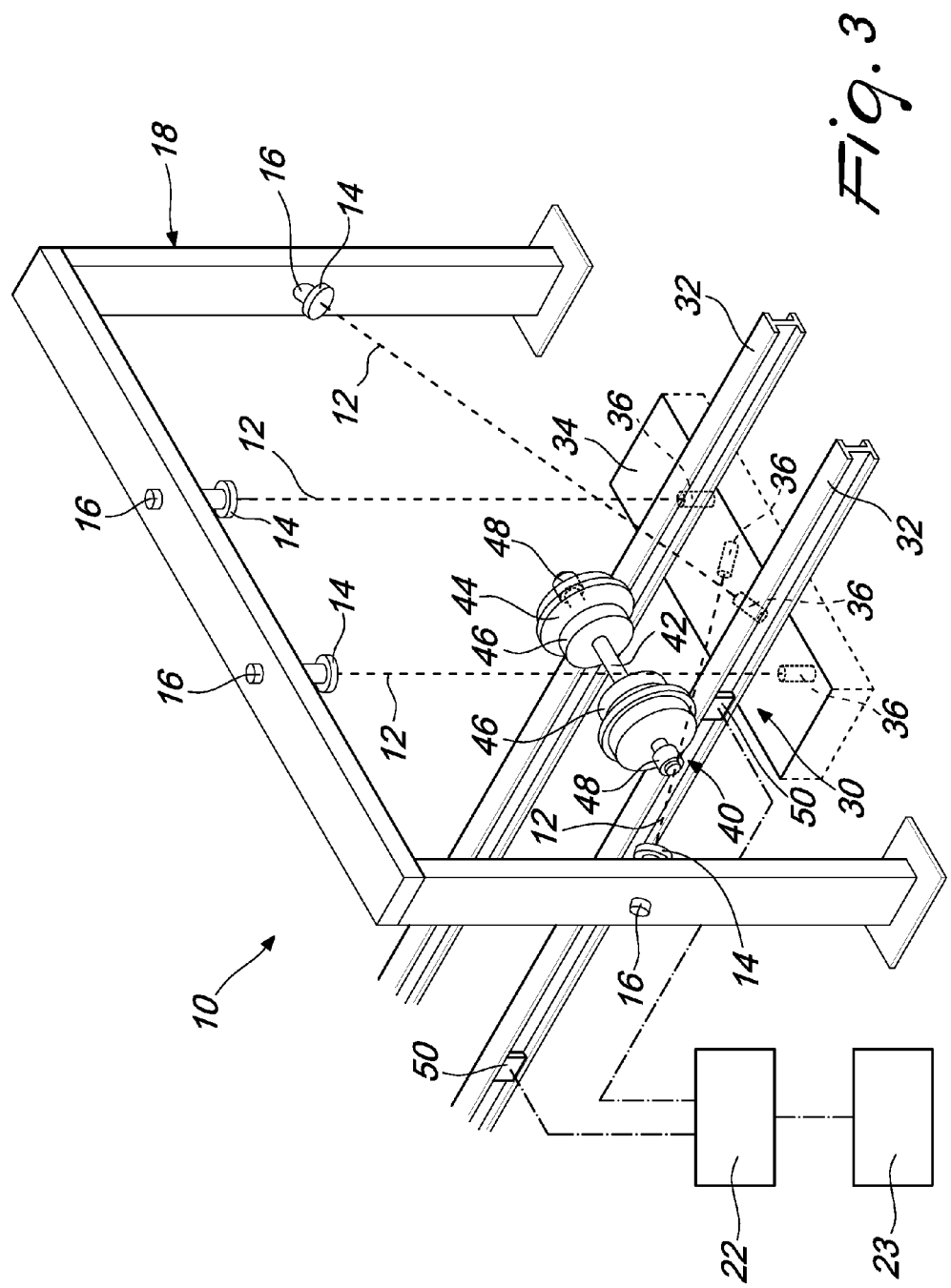
FIG. 3 is an isometric representation of a test apparatus positioned over a rail vehicle undercarriage and IR sensors embedded in a metal railroad tie, or sleeper of FIG. 1.

With reference to FIG. 3, the test apparatus 10 may comprise a wheel sensor 50 that is connected to the controller 22. In an embodiment, the test apparatus 10 may comprise a plurality of wheel sensors 50 that are each connected to the controller 22. The controller 22 may be connected to the wheel sensors 50 and the IR sensors 36.

The controller 22 may be connected to a sensor controller 23. The sensor controller 23 may control the IR sensors 36. The sensor controller 23 may activate the IR sensors 36 to detect for IR emissions. The sensor controller 23 may generate IR data based on the detected IR emissions.

A method of testing an IR sensor 36 of a rail vehicle undercarriage component may comprise the following steps. A heat emitter 14 may be provided for producing IR emissions at a reference temperature. The heat emitter 14 may be supported on a support 18 at a position spaced from the passage of the rail vehicle. The heat emitter 14 may be supported on a support 18 in an orientation for directing the IR emissions at the IR sensor 36. The heat emitter 14 may be activated to produce IR emissions at the reference temperature. The reference temperature of the IR emissions and the temperature detected by the IR sensor 36 may be compared.

With respect to the heat emitter 14 comprising a high speed IR LED 24, the step of activating the heat emitter 14 may comprise generating a high speed thermal flash from the high speed IR LED 24.

With respect to the heat emitter 14 comprising a plurality of high speed IR LEDs 24, the step of activating the heat emitter 14 may comprise generating high speed thermal flashes from the plurality of high speed IR LEDs 24. The plurality of IR LEDs 24 may generate flashes which simulate the passage of a rail vehicle. This test may enable verification of the correct positioning of the scanning window. The scanning window may correspond to the target scanning area of a rail vehicle undercarriage component The controller 22 may generate signals that simulate the wheel signals of a passing rail vehicle travelling at a known speed. The simulated wheel signals may simultaneously trigger the test apparatus 10 and the IR sensors 36.

The simulated wheel signals may be transmitted to the IR LEDs 24 to generate thermal flashes. The thermal flashes may be at a pre-selected reference temperature. The IR LEDs 24 may generate thermal flashes sequentially. The simulated wheel signals may be transmitted to the sensor controller 23 for activation of the IR sensors 36 to detect the IR emissions corresponding to the thermal flashes. The IR emissions may be indicative of the temperature of the thermal flashes from the array of IR sensors 36.

The controller 22 may compare the reference temperature of the thermal flashes generated by the IR LEDs 24 and the temperature which is obtained from the IR emissions detected by the IR sensor 36. A mismatch in the reference temperature and the detected temperature may send an error signal. The controller 22 may check if an alarm has been raised if the reference temperature is greater than a pre-set threshold temperature. An error signal may be sent if an alarm is not raised when the reference temperature is greater than a pre-set threshold temperature.

The foregoing steps may enable the IR sensors 36 to be tested for the following functions: measurement of synchronicity with the IR LEDs 24, velocity calculation of the rail vehicle and the reduction factor of the acquired IR emissions data.

With respect to the heat emitter 14 comprising the heat member 25 having a black surface 26 coupled to a resistor, the step of activating the heat emitter 14 may comprise heating the black surface 26 by the resistor. The controller 22 may transmit signals to the resistor so as to heat the black surface 26 to a pre-selected temperature. The temperature of the black surface 26 may be checked by the controller 22 through the temperature sensor 28.

The controller 22 may transmit signals to the sensor controller 23 for activation of the IR sensors 36 to detect the IR emissions corresponding to the thermal radiation from the black surface 26 when the temperature of the black surface 24 reaches a pre-selected temperature. The IR emissions may be indicative of the temperature of the thermal radiation from the black surface 24.

The controller 22 may compare the reference temperature of the thermal radiation from the black surface 26 and the temperature which is obtained from the IR emissions detected by the IR sensor 36. A mismatch in the reference temperature and the detected temperature may send an error signal. The controller 22 may check if an alarm has been raised if the reference temperature is greater than a pre-set threshold temperature. An error signal may be sent if an alarm is not raised when the reference temperature is greater than a pre-set threshold temperature.

The foregoing steps may enable the IR sensors 36 to be tested for the following functions: IR sensor 36 alignment to the heat emitter 14 and the accuracy of the measurement by the IR sensor 36.

The heat member 25 may enable the measurement accuracy of the IR sensor 36 to be tested to a high level of accuracy since the reference temperature may be accurately controlled by the resistor and may be checked by the temperature sensor 28. The reference temperature may be varied to specific pre-selected values through the controller 22.

The test apparatus 10 may be provided with a plurality of heat emitters 14 corresponding to a plurality of IR sensors 36. Each heat emitter 14 may supply a reference temperature for detection by a corresponding IR sensor 36.

The step of activating the heat emitter 14 may comprise activating the plurality of heat emitters 14 one at a time. The plurality of heat emitters 14 may be activated in sequence. The plurality of heat emitters 14 may be activated randomly. The controller 22 may transmit signals resistor so as to heat the respective black surfaces 26 to a pre-selected temperature.

The controller 22 may transmit signals to the sensor controller 23 for activation of the IR sensor 36 corresponding to the activated heat emitter 14 when the temperature of the black surfaces 26 reaches the pre-selected temperature. The IR sensors 36 may be activated to detect the IR emissions corresponding to the thermal radiation from the respective black surfaces 26.

The controller 22 may compare the reference temperature of the thermal radiation from the black surfaces 26 and the temperature which is obtained from the IR emissions detected by the IR sensors 36. A mismatch in any one of the reference temperatures and the detected temperatures may send an error signal. The controller 22 may check if an alarm has been raised if the reference temperatures are greater than a pre-set threshold temperature. An error signal may be sent if an alarm is not raised when the reference temperatures are greater than a pre-set threshold temperature.

In an embodiment, the plurality of heat emitters 14 may be activated simultaneously. The controller 22 may transmit signals resistor so as to heat the respective black surfaces 26 to a pre-selected temperature. The controller 22 may transmit signals to the control circuit of the IR sensors 36 corresponding to the activated heat emitter 14 when the temperature of the black surfaces 26 reaches the pre-selected temperature. The IR sensors 36 may be activated alternatively to detect the IR emissions corresponding to the thermal radiation from the respective black surfaces 26. The plurality of IR sensors 36 may be activated in sequence. The plurality of IR sensors 36 may be activated randomly.

The step of activating the heat emitter 14 may comprise activation of a wheel sensor 50. The controller 22 may monitor the wheel sensor 50 and record the signals and the information relating to the passage of a rail vehicle used by the IR sensors 36 to detect the IR emissions from an undercarriage component. After a time lag the controller may activate the heat emitter 14 and may transmit signals to the IR sensor 36. The controller 22 may use the signals and information from the wheel sensor 50 to issue signals which replicate signals from the wheel sensor 50. The replicated signals from the controller may simulate the wheel signals of a passing rail vehicle travelling at a known speed. The replicated wheel signals may simultaneously trigger the test apparatus 10 and the IR sensors 36.

The replicated wheel signals may be transmitted to the IR LEDs 24 to generate thermal flashes. The thermal flashes may be at a pre-selected reference temperature. The IR LEDs 24 may generate thermal flashes sequentially. The replicated wheel signals may be transmitted to the sensor controller 23 for activation of the IR sensors 36 to detect the IR emissions corresponding to the thermal flashes. The IR emissions may be indicative of the temperature of the thermal flashes from the array of IR sensors 36.

The controller 22 may compare the reference temperature of the thermal flashes generated by the IR LEDs 24 and the temperature which is obtained from the IR emissions detected by the IR sensor 36. A mismatch in the reference temperature and the detected temperature may send an error signal. The controller 22 may check if an alarm has been raised if the reference temperature is greater than a pre-set threshold temperature. An error signal may be sent if an alarm is not raised when the reference temperature is greater than a pre-set threshold temperature.

The above tests may be performed by the controller 22 periodically at pre-determined time intervals.

The skilled person would appreciate that foregoing embodiments may be modified or combined to obtain the test apparatus 10 of the present disclosure.

INDUSTRIAL APPLICABILITY

This disclosure describes a test apparatus 10 for testing an IR sensor 36 which may be used to obtain data, such as infrared IR emission data. The data may be obtained by sensing a wheel 44 or a wheel bearing 46, 48 of a vehicle, such as a rail car, passing over the IR sensor 36.

The test apparatus 10 may perform a test on the IR sensor 36 in the absence of a passing rail vehicle or immediately upon passage of a rail vehicle. The test apparatus 10 may test the accuracy of the infrared IR emission data obtained by the IR sensor 36. The test apparatus 10 may test the alignment of the IR sensor 36. The test apparatus 10 may test the correct position of a measuring window of the IR sensor 36.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

What is claimed is:

1. A test apparatus for an IR sensor of a rail vehicle undercarriage component, the test apparatus comprising:
   a heat emitter for producing IR emissions at a reference temperature, the heat emitter includes a heat member having a black surface coupled to a resistor; and
   a support for supporting the heat emitter at a position spaced from the passage of the rail vehicle and in an orientation for directing the IR emissions at the IR sensor.

2. The test apparatus of claim 1 wherein the heat emitter comprises at least one high speed IR LED.

3. The test apparatus of claim 1 wherein the heat emitter comprises a plurality of high speed IR LEDs arranged in an array corresponding to an array of IR sensor elements in the IR sensor.

4. The test apparatus of claim 1 further comprising a plurality of heat emitters.

5. The test apparatus of claim 1 wherein the support is an upright frame spanning a rail track.

6. The test apparatus of claim 1 further comprising a test circuit connecting the heat emitter to a controller.

7. The test apparatus of claim 6 wherein the controller is connected to a wheel sensor.

\* \* \* \* \*